(12) United States Patent
Fuente et al.

(10) Patent No.: US 9,686,170 B2
(45) Date of Patent: Jun. 20, 2017

(54) MEASURING DELAY

(71) Applicant: International Business Machines Corporation, Armonk, NY (US)

(72) Inventors: Carlos F. Fuente, Portsmouth (GB); John P. Wilkinson, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 14/731,646

(22) Filed: Jun. 5, 2015

(65) Prior Publication Data

US 2016/0020980 A1    Jan. 21, 2016

(30) Foreign Application Priority Data

Jul. 18, 2014  (GB) .................................. 1412774.0

(51) Int. Cl.
*H04L 12/26*     (2006.01)
*G06F 11/34*     (2006.01)

(52) U.S. Cl.
CPC .......... *H04L 43/0852* (2013.01); *G06F 11/34* (2013.01); *G06F 11/3419* (2013.01); *G06F 11/3452* (2013.01); *H04L 12/26* (2013.01)

(58) Field of Classification Search
None
See application file for complete search history.

(56) References Cited

U.S. PATENT DOCUMENTS

| 4,937,780 | A | 6/1990 | Geyer et al. |
| 5,265,249 | A | 11/1993 | Kumamoto |
| 6,269,479 | B1 | 7/2001 | Puram |
| 7,137,120 | B2 * | 11/2006 | Armstrong .......... G06F 11/3419 700/109 |
| 7,207,043 | B2 | 4/2007 | Blythe et al. |
| 7,860,234 | B2 | 12/2010 | Patakula et al. |
| 8,417,817 | B1 | 4/2013 | Jacobs |

(Continued)

FOREIGN PATENT DOCUMENTS

CN    102609312 A    7/2012

OTHER PUBLICATIONS

Smith et al., "Using Run-Time Predictions to Estimate Queue Wait Times and Improve Scheduler Performance," Proceedings of the Job Scheduling Strategies for Parallel Processing, pp. 202-219, Springer-Verlag London, UK ©1999 ISBN: 3-540-66676-1.

(Continued)

*Primary Examiner* — Hong Cho
(74) *Attorney, Agent, or Firm* — Nicholas D. Bowman (57) ABSTRACT

Delay in the allocation of resources can be measured for a set of sequential requests for the resources. A start time for the receipt of the first request of the set can be recorded, followed by the incrementing of a request start time counter, with the current time minus the recorded start time, for each subsequently received request. A total time counter can be incremented, with the current time minus recorded start time, for each request allocation, and a request counter can be incremented for each request allocation. When determining that all received requests have been allocated, and decrementing the total time counter by the request start time counter, it is possible to determine an average delay time from the total time counter value divided by the request counter value.

9 Claims, 6 Drawing Sheets

(56) References Cited

U.S. PATENT DOCUMENTS

| | | | |
|---|---|---|---|
| 8,650,298 | B2 | 2/2014 | Daly et al. |
| 8,881,165 | B2 * | 11/2014 | Chambliss ............... G06F 9/46 710/7 |
| 9,306,894 | B1 * | 4/2016 | Anderson ............... H04L 51/24 |
| 2004/0093254 | A1 * | 5/2004 | Hirata ................. G06F 11/3409 709/224 |
| 2007/0106798 | A1 * | 5/2007 | Masumitsu ........... G06F 9/5027 709/226 |
| 2009/0307707 | A1 | 12/2009 | Gellerich et al. |
| 2013/0238800 | A1 | 9/2013 | McClement |
| 2013/0262556 | A1 | 10/2013 | Xu et al. |

OTHER PUBLICATIONS

Tammaro et al., "Dynamic Resource Allocation in Cloud Environment Under Time-variant Job Requests," 2011 Third IEEE International Conference on Cloud Computing Technology and Science, Nov. 29-Dec. 1, 2011, pp. 592-598 DOI: 10.1109/CloudCom.2011.91.

Zhong et al., "Optimal Time-Variant Resource Allocation for Internet Servers with Delay Constraints," Proceedings of the 11th IEEE Real Time and Embedded Technology and Applications Symposium, Mar. 7-10, 2005, pp. 22-31 DOI: 10.1109/RTAS.2005.37.

GB Application 1412774.0, Entitled "Measuring Delay," Filed Jul. 18, 2014.

International Search Report dated Jan. 15, 2015 for International Application GB1412774.0.

* cited by examiner

MEASURING DELAY

BACKGROUND

The present disclosure relates to a method of, and system for, measuring the delay in the allocation of resources. Computing systems can have a limited set of resources, can have more users of resources than there are resources, which may highlight a need to allocate resources to users in a well-defined way. The resources can be allocated in the order that the users requested them, so if there are x resources, and x+10 requests for resources, the first x requests for resources will immediately be allocated a resource, and the next 10 will have to wait for some of the earlier users to finish using their resources. This waiting will normally be implemented with a queue, as opposed to a stack or any other way of managing a list of multiple objects, with the requests queued at one end of the queue as they are submitted, and de-queued from the other end of the queue as the resources become available, and can be allocated.

SUMMARY

According to certain aspects of the present disclosure, there is provided a method of measuring the delay in the allocation of resources, for a set of sequential requests for the resources. The method includes recording a start time for the receipt of the first request of the set, incrementing a request start time counter, for each subsequently received request, with the current time minus the recorded start time. The method also includes incrementing a total time counter, for each request allocation, with the current time minus the recorded start time, and incrementing a request counter, for each request allocation.

According to certain aspects of the present disclosure, there is provided a system for measuring the delay in the allocation of resources, for a set of sequential requests for the resources. The system includes a processor arranged to record a start time for the receipt of the first request of the set, to increment a request start time counter, for each subsequently received request, with the current time minus the recorded start time. The processor is also arranged to increment a total time counter, for each request allocation, with the current time minus the recorded start time, and increment a request counter, for each request allocation.

According to particular aspects of the present disclosure, there is provided a computer program product on a computer readable medium for measuring the delay in the allocation of resources, for a set of sequential requests for the resources. The computer program product includes instructions for recording a start time for the receipt of the first request of the set, for incrementing a request start time counter and for each subsequently received request, with the current time minus the recorded start time. The computer program product also includes instructions for incrementing a total time counter, for each request allocation, with the current time minus the recorded start time, and incrementing a request counter, for each request allocation.

In certain embodiments, it is possible to provide a methodology for accurately calculating the average delay in the allocation of resources, without the need to store per request information. This provides a process that is highly scalable, without the memory requirement also being scalable. Only a very small amount of data has to be captured as requests are received and allocated, but still an accurate measurement of the true average delay per request can be taken. No per-request data needs to be stored to capture and calculate the average, which can provide significant benefits. The methodology does not require large amounts of processing instructions to operate, so also does not create any processing overhead, while still delivering the precise information required. In relation to the request and allocation of resources, the term "resources" used herein can be of a variety of types. For example, resources may include memory objects, physical objects, or database objects, for which exclusive access is needed, and access is given in request order.

By splitting up multiple queuing resource requests into different phases, and recording information about when requests start relative to the beginning of a phase, it is possible to accurately track delay time for any number of requests using only seven integers. The set of sequential requests is split into a series of phases, each phase containing a start request and all other requests received before the start request has been allocated and all values are calculated on a per-phase basis. This could take 28 bytes as opposed to the 4 MB example referred to above. At times the exact average delay may not be known, but the error will be predictable and bounded. Variants of the methodology are possible for a simple method that assumes a finite number of queuing requests, a 2-phase variant that can handle unlimited queuing requests, and a 3+/- phase variant that limits the magnitude of error. Each variant has a different memory consumption that is constant, regardless of the number of queuing requests.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Particular embodiments of the present disclosure will now be described, by way of example only, with reference to the following drawings.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

The present disclosure may be a system, a method, and/or a computer program product. The computer program product may include a computer readable storage medium (or media) that is not a transitory signal per se, the storage medium having computer readable program instructions thereon for causing a processor to carry out aspects of the present disclosure.

In performance-sensitive applications, it can be important to know how long processes are being delayed while waiting for such limited resources. Generating an average queuing time for resources can provide a good estimate of where the bottlenecks are and how heavily loaded the system is. It may be useful to monitor such delays to sustain performance commitments that the system is making, for example, that an object will be available within 2 ms.

A conventional method for solving this problem is to have a per-request timestamp, set when the request for such an object is made. The timestamp is of a granularity and format appropriate to the expected delay times, for example, recording the current value of a 32-bit μs timer when the delay is likely to be around 1 ms, and will never be longer than one minute. When the resource is allocated for that request, the difference between the current time and the per-request timestamp is added to a time accumulator, t, for that resource type, and the request count, c, is incremented for that resource type. The average delay from when this recording started can be determined by dividing t by c, which will give a value of the same accuracy and units that the timestamp is recorded in. It is possible to periodically take copies of t/c, and then set both t and c to zero, to allow recording average delay over multiple discrete periods.

The disadvantage of such a solution is that storage for a per-request timestamp is needed for every resource. If there are many potential requests for an object type, this storage requirement can be sufficiently large that delay timing will be avoided even when it could be useful, to limit storage use. For example, if a million requests may be expected for resources of a particular type, and the timestamp must be stored with 4 bytes width to allow for sufficient range and granularity, this timing will introduce a roughly 4 MB memory overhead on the system.

Figure 1:
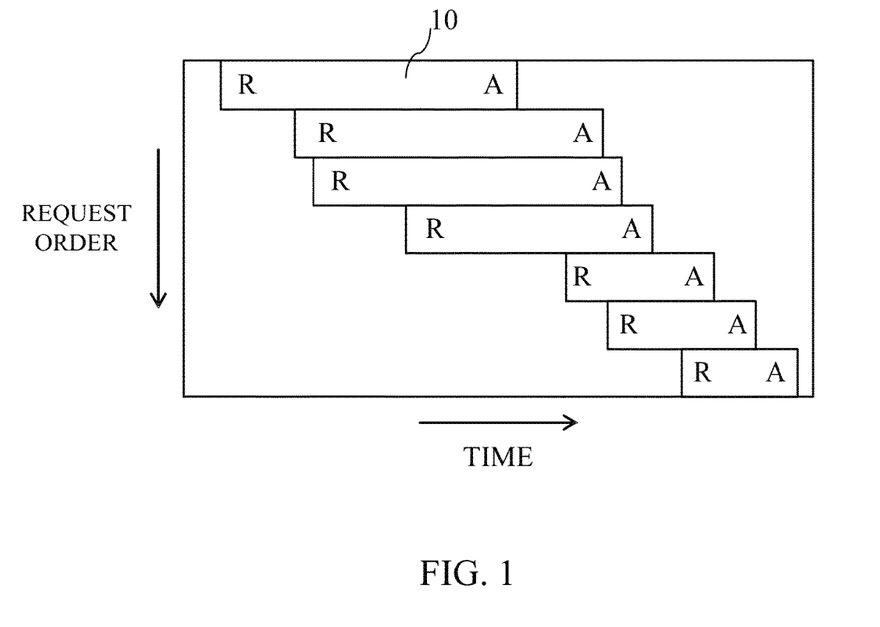
FIG. 1-4 are schematic diagrams illustrating delay in requests being allocated according to embodiments of the present disclosure
Figure 2:
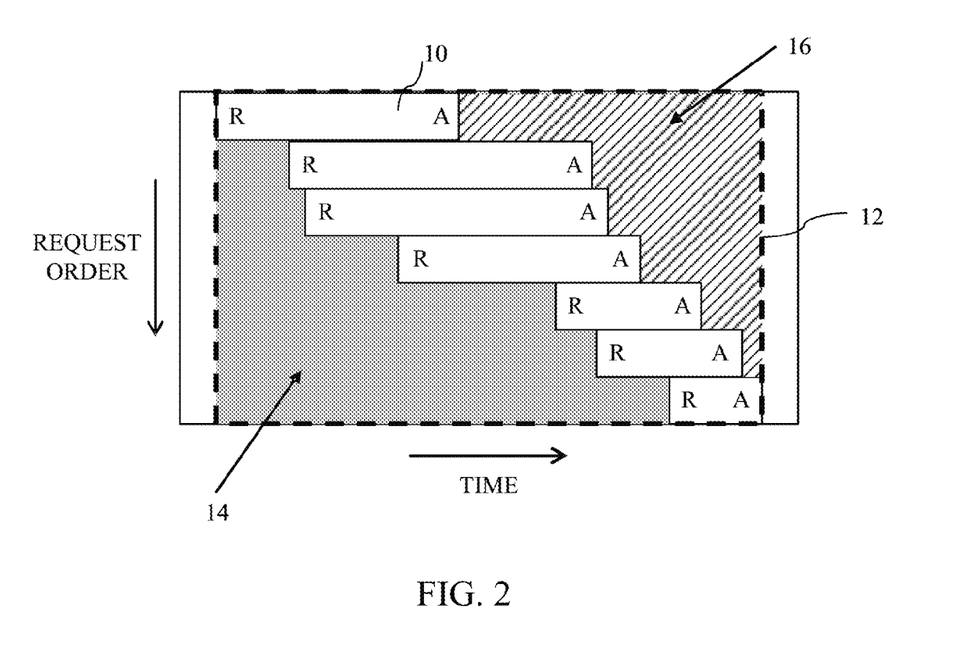

FIG. 1 and FIG. 2 illustrate the concept of simple delay counting. FIG. 1 shows a sequence of requests 10. Each rectangle represents the lifespan of a request where they are initially requested (R) and then later allocated (A). As the system allocates resources in strict order, no allocation may be before that for an earlier request. FIG. 2 illustrates the concept of estimating the time taken for the requests to be allocated. Considering a set of requests, the total time taken can be estimated by multiplying the number of requests by the time from the first request being submitted to the last request being allocated. In FIG. 2, this is represented by the area enclosed by the square dashed box 12. This is however an overestimate of the true total time taken.

To arrive at a more accurate estimate, the area of the box 12 needs to be reduced by the (roughly triangular) area 14 in solid grey, representing the fact that not all requests were submitted at the same time, and by the (roughly triangular) area 16 in striped grey, representing the fact the requests were not all allocated at the same time. It is therefore necessary to accumulate the size of these two areas as requests are submitted and allocated, and thus compensate the overestimate to get an accurate value.

This may be implemented as follows, with all values recorded in common variables for the resource being monitored, using a start time Tstart, a request counter Count, a request start time counter Astart and a total time counter Ttotal:

1. Initially, Tstart is invalid; Count, Astart and Ttotal are 0.
2. When the first request is submitted, record the current time in Tstart.
3. When subsequent requests are submitted, add (current_time−Tstart) to Astart.
4. When each request is allocated, add (current_time−Tstart) to Ttotal and increment Count.
5. When the final request is allocated, decrease Ttotal by Astart, and set Astart to zero.
6. Continue at operation 2 for the next allocation.

Tstart records the time that the first of a set of requests was submitted, Astart records the amount of time that total will need to be adjusted down by due to later requests being submitted later than Tstart, and Ttotal records the total length of time over which requests have been delayed. Astart represents the solid grey area 14. It is not necessary to explicitly track the striped grey area 16, as it is possible to increment Ttotal as each request is allocated by the exact time since Tstart.

This methodology can use unsigned integers throughout, since as the algorithm can only decrease Ttotal by less than its current value, it can never become less than zero. As the time differences are always calculated by subtracting the earlier time from the later time, the algorithm gets correct values even as the timestamp wraps past zero. Only four integers are required, no matter how many requesting objects there may be: Tstart, Astart, Ttotal, and Count. The average delay time, Tav can be calculated as:

$$((Ttotal/Count)-Astart) \geq Tav \geq (Ttotal/Count)$$

Thus at points in the algorithm where Astart is zero, it is possible to calculate an exact value for Tav. At other points, it is known that the average allocation time was at most (Ttotal/Count), and may be as much as Astart less. When Astart is zero, it is possible to copy Tav to a separate location, so that the most recent accurate value can be recorded. The system may periodically set Count and Ttotal back to 0 after copying Tav, so that the average delay time over multiple discrete periods can be measured.

Interpolation of the simple delay described above is required to calculate an accurate figure, since in general there will always be requests waiting to be allocated. A linear interpolation of the expected value at any time may be calculated as:

$$(Ttotal/Count)-(Astart*(Calloc/Creq)^2),$$

where Creq is the number of submitted requests since Tstart (not including the request at Tstart) and Calloc is the number that have been allocated (not including the request at Tstart). In the equation above, "*" is the multiplication operation, and "²" is the squaring operation. This equation assumes that requests are submitted at equally spaced points in time, and thus the fraction of Astart that is needed to incorporate can be estimated as though the solid grey area 14 is a regular triangle.

Figure 3:
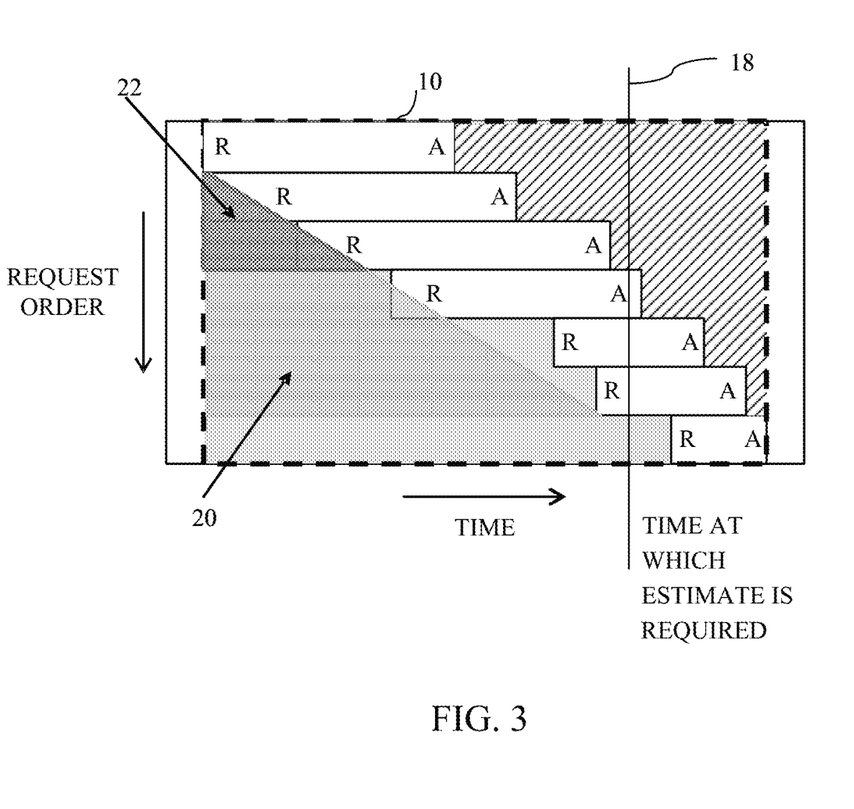

FIG. 3 illustrates the principle of interpolating the average time when Astart is non-zero. In this case an estimate is needed for the total delay at the time marked by the vertical line 18. It is logical to form a triangle from the latest request back to Tstart: this is the larger, pale triangle 20. Of the five requests received since Tstart, three have not been allocated yet, so Ttotal does not need to be adjusted for them. Assuming that the requests are received at equal intervals, and thus fall on the hypotenuse of the large triangle 20, it is possible to form a smaller triangle of the same proportions that only includes the allocated requests. This is shown as the smaller, darker triangle 22.

The larger triangle has an area of Astart. The smaller triangle 22 has sides that are (Calloc/Creq) the size of the sides of the larger triangle 20, and thus has an area of (Calloc/Creq). In FIG. 3, the estimated total delay time would be Ttotal−Astart*(4/25). Until the first request submitted after Tstart is allocated, the estimated total delay time would accurately be calculated as simply Tstart.

Whether or not such an estimate is useful depends on the application. Where requests are received in such a way that linear modeling is not accurate, for example if batching means that many requests are made at once, this estimate will not be helpful. A statistical analysis of the accuracy of this estimate depends on the application and will not be considered here. The algorithm described thus far, with or without the linear interpolation, works in every case where the number of queuing requests will eventually be zero, though Astart may grow large over time. In cases where there are insufficient resources, it is common for there to always be outstanding requests, so Astart will be unbounded. In this case it is necessary to consider the requests in phases.

Figure 4:
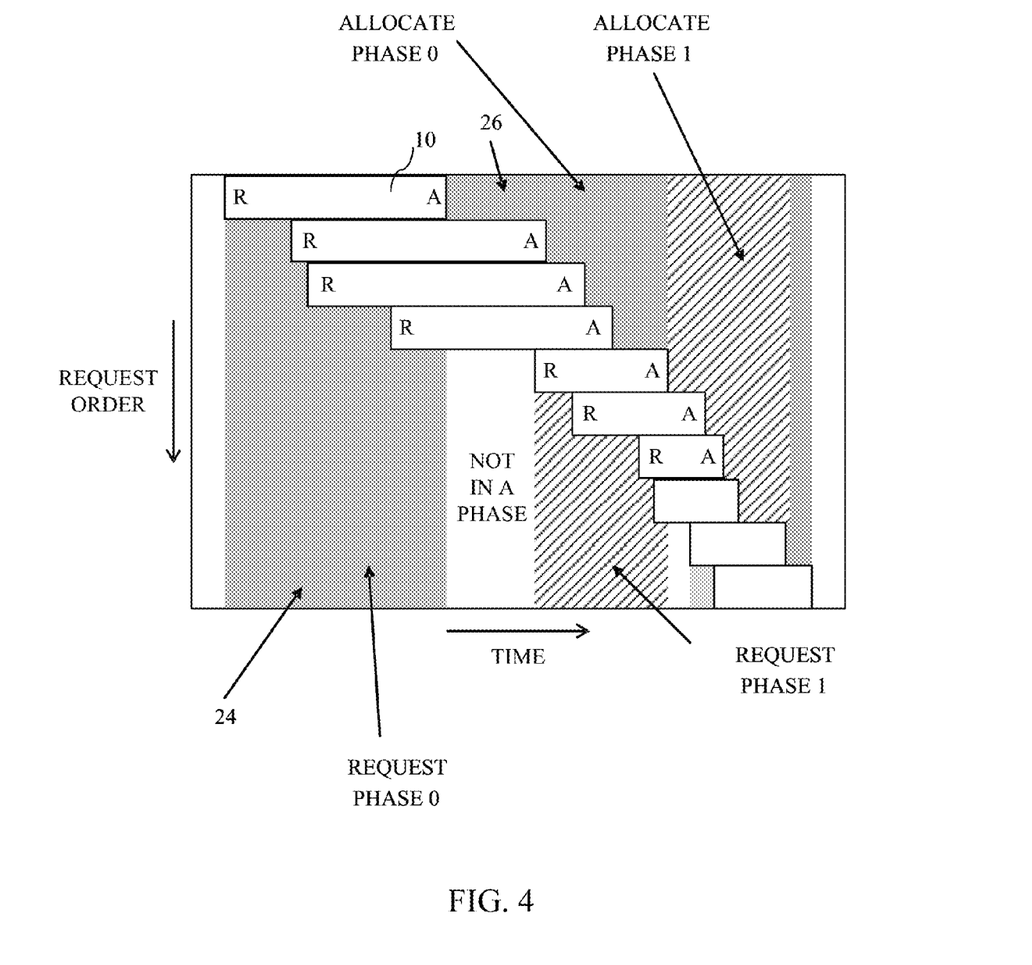

FIG. 4 illustrates the concept of phased delay counting, whereby consecutive requests are grouped together into phases. At any one time, there may be at most one request phase 24 and one allocate phase 26 in existence. Generally, allocate phase n coincides with request phase n+1. The first request 10 received defines the start of a request phase and all of the requests that are received while the first request is not allocated are assigned to this request phase. The next received request will begin the start of the next request phase. The allocate phase starts when the first request is allocated and continues until the first request of the next request phase is allocated.

It is possible to monitor the average delay for a set of requests that are requested in a single phase. In the example in FIG. 4, the first four requests are requested in request phase 0 and allocated in allocate phase 0. The next four are requested in request phase 1 and allocated in allocate phase 1. A request phase starts initially when the first request is submitted. It continues until that first request is allocated. Any requests submitted between the first request submission and allocation form part of that request phase. The allocate phases are arranged such that all requests submitted in the same request phase will be allocated in the same allocate phase. Thus the first allocate phase starts when the first request is allocated, and continues while the requests submitted while the first request was outstanding are allocated. The next allocate phase starts when the first request of the next request phase is allocated.

As the algorithm transitions from one allocate or request phase to the next at the point that the first request of a phase is allocated, it is possible to record a reference to that first request, called the boundary pointer Pbound. This will be invalid between the start of a request phase and the first request of the phase being submitted. For the queue of delayed requests, Pbound marks the boundary of requests made in the current request phase, which will be later in the queue than Pbound, and requests made in the last request phase (which are now in their allocate phase), which will be earlier in the queue than Pbound.

Figure 5:
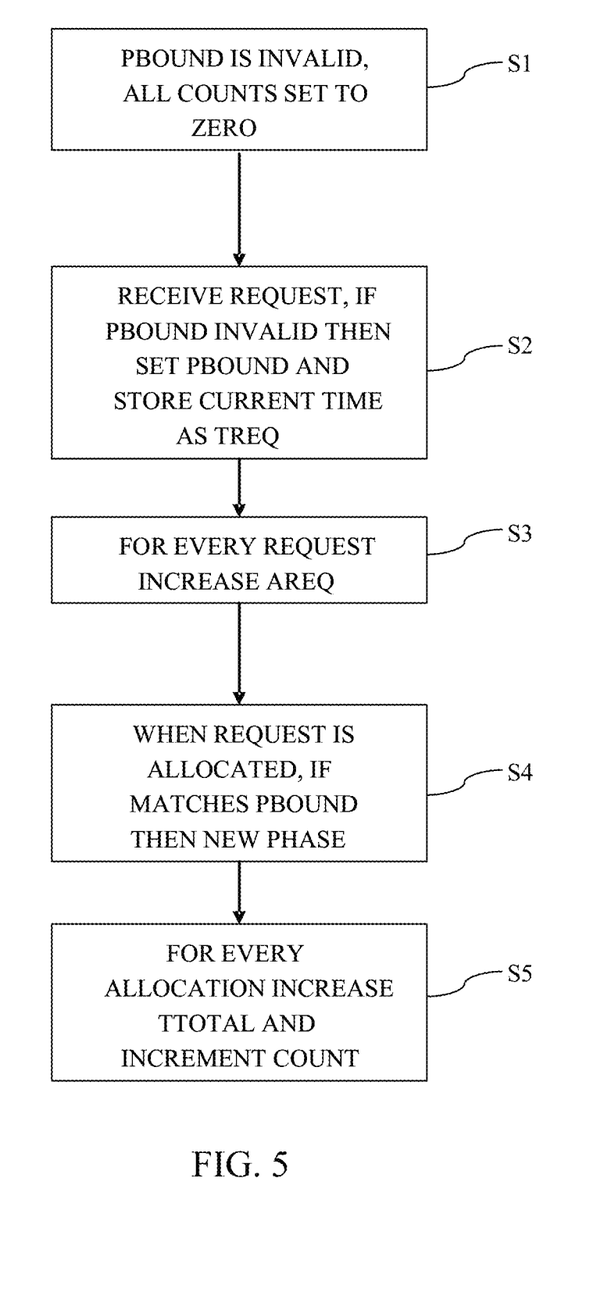
FIG. 5 is a flowchart depicting a method of calculating delay in request allocation.

FIG. 5 illustrates the delay calculation process, when using phases as shown in the requests of FIG. 4. The process is similar to that described before with reference to FIG. 2, but with the addition of the two phases 24 and 26:

1. Initially, Pbound is invalid, and Treq, Areq, Talloc, Aalloc, Count, and Ttotal are zero.
2. When a request is submitted, if Pbound is invalid, set Pbound to refer to that request, and store the current time in Treq.
3. For every request submitted, increase Areq by (current_time−Treq)
4. When a request is allocated, if the allocated request matches Pbound, this marks a new phase. Remember to decrease Ttotal after operation 5 by Aalloc. Set Talloc to Treq, Aalloc to Areq, and clear Areq. Invalidate Pbound.
5. For every request allocated, increase Ttotal by (current_time−Talloc) and increment Count by 1. If this is the last request (no more are queued), decrease Ttotal by Aalloc and clear Aalloc.

Although FIG. 4 shows the operations sequentially, operations 2 to 5 occur in parallel continuously, though for a set of requests they largely follow in order. Operations 2 and 3 address the request phase requirements, and operations 4 and 5 implement the allocate phase. Treq and Areq are used in the request phase, and Talloc and Aalloc are used in the allocate phase. While requests are being submitted according to operations 2 and 3, earlier requests are being allocated according to operations 4 and 5.

In operation 2, the start of a request phase is marked. At the end of the previous request phase, Pbound was invalidated, so it can be detected that a new request phase should start when a request is submitted with an invalid Pbound. Pbound is set to refer to the new request, to record what the first request of the phase is, and so it is possible to identify later the end of the phase.

The time that the request phase started was also recorded in Treq. In operation 3, which applies to every request in a phase, Areq is incremented by (current_time−Treq), which records how late the requests were compared to the start of the phase, and so how much Ttotal will be over-increasing by when allocating the requests submitted in this phase.

In operation 4, the end of a request phase is detected when the request submitted at the start of the request phase in operation 2 is allocated, in other words the request referred to by Pbound. At this point, the next allocate phase is also started. As the requests allocated in this phase will be those requested in the just-completed request phase, the time of the start of that request phase, Treq, is stored in Talloc so it can be used in the just-started allocate phase. Likewise, the adjustment value accumulated in Areq can only be applied after all the requests submitted in the just-completed request phase are allocated in the just-started allocate phase, so this is stored in Aalloc, to be applied later. This adjustment may be performed by decrementing Ttotal by the old value of Aalloc before it is overwritten with the current value of Areq.

Having completed the request phase, the adjustment accumulated during the phase is cleared by setting Areq to 0. Treq will be updated as soon as the next request is submitted according to operation 2.

In operation 5, which is applied to every request being allocated, it is recorded how long that allocation has taken, by increasing Ttotal by (current_time−Talloc), in other words the time since the start of the request phase in which the request was submitted. This will increase Ttotal by too much if the request was not submitted at the start of the request phase, but this inaccuracy will have already been captured in the adjustment factor Areq at the time the request was submitted, and copied to Aalloc at the start of this allocation phase. It will then be deducted from Ttotal at the end of the allocation phase, after all the allocations have completed that it needs to adjust Ttotal for. If there are no more delayed requests queued after the one being allocated, then decrement Ttotal by the new value of Aalloc too, and then sequence Aalloc to zero. This corrects Ttotal without waiting for the next allocate phase to start, which may take some time.

Note that operation 2 and 3 happen from the same stimulus to the system, and so the processing must be sequenced. An example pseudo-code sequence for these operations is as follows:

```
procedure request_submitted ( request_pointer )
    if Pbound is invalid
        set Treq to current_time
        set Pbound to request_pointer
    increase Areq by (current_time - Treq)
```

Such sequencing implements operations 2 and 3 in a compact way. Example pseudo-code for operations 4 and 5, which again occur together is as follows:

```
procedure request_allocated ( request_pointer )
    set Adjust to 0
    if Pbound matches request_pointer
        increase Adjust by Aalloc
        set Aalloc to Areq
        set Talloc to Treq
        set Areq to 0
        if no more delayed requests
            increase Adjust by Aalloc
    increase Ttotal by (current_time - Talloc)
    increase Count by 1
    decrease Ttotal by Adjust
```

This implements the process of operations 4 and 5, accommodating cases where the first allocation in the allocation phase is also the last queued delayed request. It also is careful to never take Ttotal to a negative number. This entire process can again be implemented with unsigned integers, with six being needed: Ttotal, Count, Areq, Aalloc, Treq, Ttotal, and a reference (e.g., a memory pointer), Pbound. At any point, the average delay time Tav may be calculated as:

$$((Ttotal/Count)-Aalloc) \geq Tav \geq (Ttotal/Count)$$

Noting that Ttotal has not been modified for any of the writes in the request phase, there is no need to use Areq in this formulation. In operation 4, when the allocated request matches Pbound, Aalloc is updated to Areq, it is the start of the allocation phase, so Ttotal has not been increased more than it should for this allocation phase. So at this point, Tav absolutely matches (Ttotal/Count). Aalloc and Areq may still grow large with the phased delay counting, but are significantly more bounded than the earlier simple case. The maximum it may grow to is the maximum time for a request to progress through the delay queue multiplied by the maximum number of queuing requests, or $$(max\_queuing\_requests)^2 * Tav$$

It would be reasonable to use 64-bit integers for Aalloc and Areq when the maximum number of queuing requests is over 1,000 to avoid overflow errors.

As with the simple delay counting above, it is possible to interpolate an expected value of Tav. Only relevant is the portion of Aalloc that should be applied for the requests that have already been allocated in the current allocation phase, and therefore Tav can be estimated as:

$$(Ttotal/Count)-(Aalloc*(Calloc/Creq)^2),$$

where Creq is the total number of requests that will be allocated in this allocation phase after the first (i.e., the number submitted in the last request phase minus one). Calloc is the number of requests that have been allocated so far not including the first, so the number since allocating the request pointed to by Pbound. "*" is the multiplication operation, and "$^2$" is the squaring operation.

It is possible that while a request is outstanding, a client (machine or program) that submitted the request no longer needs the resource. If it is possible to leave the request queuing and then immediately free the resource when allocation happens, the cancellation does not need to be accounted for by this delay measurement methodology, however it would be usual to require the request to leave the queue so the client's queuing resource can be used elsewhere. In this case, there are two alternatives. These apply to both the simple and phased delay counting methods described above.

Firstly, it is possible to remove a proportion of the adjustment factor for the request. For the simple delay counting, this will be Astart that should be decremented. For the phased delay counting, the algorithm will need to decrease Areq if the request was submitted in the current request phase (so the request referred to by Pbound was queued earlier than the request being cancelled), or Aalloc if the request was made in the last request phase (so Pbound is invalid, or was queued later than the request being cancelled). The adjustment factor is decreased by:

$$2*Rnum*A/(Rmax*(Rmax+1)),$$

where for simple delay counting, Rnum is the zero-based index of the request being cancelled since Tstart (so the first one requested after Tstart would have an Rnum of 1), Rmax is the largest zero-based index of all the requests since Tstart (so it is the number of requests submitted after Tstart), and A is the adjustment factor Astart. For phased delay counting, Rnum is the zero-based index of the request being cancelled within its phase, Rmax is the largest zero-based index of the requests in its phase, and A is Areq if the request was made in the current request phase, or Aalloc if it was made in the last request phase. This is derived from similar logic to the interpolation before.

Secondly, the algorithm can operate as though the cancelled request completed successfully at the point of cancellation, and increase Ttotal by (current_time−Tstart) for simple delay counting, (current_time−Treq) for phased delay counting where the cancelled request was submitted in the current request phase, or (current_time−Talloc) for phased delay counting where the cancelled request was submitted in the previous request phase.

Whichever method is used, an additional complication exists for phased delay counting: if the request being cancelled is that referred to by Pbound (i.e., is the first request of a request phase), the requests in the phases either side of the boundary must be merged together. This is simplest to do by moving the requests in the current request phase to the current allocate phase. This is achieved by:

1. Invalidating Pbound,
2. Increasing Aalloc by (Treq−Talloc)*(requests left in request phase),
3. Increasing Aalloc by Areq, and
4. Clearing Areq.

Operations 2 and 3 here increase Aalloc by the total time that the requests left in the request phase were submitted after Talloc.

The algorithm has been described as a 2-phased counting, with each request currently known about being in one of two phases. It would similarly be possible to split requests into more than 2 phases to provide 3 or more phased delay counting. This can be achieved if the phase-start time and adjust variables were turned into arrays T[ ] and A[ ], another array C[ ] would record the number of outstanding requests submitted in the phase matching the appropriate element of A and T. T[0] would be set to the time of submission of the first request. A[0] would be increased by (current_time−T[0]) for each subsequent request. After a fixed number of requests or a certain amount of time had passed, T[0] . . . T[n−2] would be copied to T[1] . . . T[n−1], C[0] . . . C[n−2] would be copied to C[1] . . . C[n−1], and A[0] . . . A[n−2] would be copied to A[1] . . . A[n−1]. A[0] would be cleared, and the next request submitted would set T[0] to the then-current time. As requests are allocated, the last non-zero value of C[ ] is found, and its index i remembered. Ttotal is then incremented by (current_time−T[i]), and C[i] decremented by one. If C[i] reaches 0, Ttotal is decremented by A[i]. Ttotal is too high at any point by at most A[i]. A circular buffer could be used for implementing the arrays C, T, and A, and such an implementation could avoid copying the arrays along by one element; instead, incrementing the start index of the circular buffer.

The size of the arrays, n, should be chosen together with the frequency of starting new phases to ensure that if the maximum number of requests were submitted, that there would always be sufficient phases to record them. This can significantly decrease the adjustment factor and thus improve the accuracy, where the magnitude of the inaccuracy of Ttotal is inversely proportional to the square of the number of phases.

The cost for additional phases is the use of extra memory. Two unsigned integers will be used for Ttotal and Count, with three integers (one for each of C, T, and A) for every phase.

Figure 6:
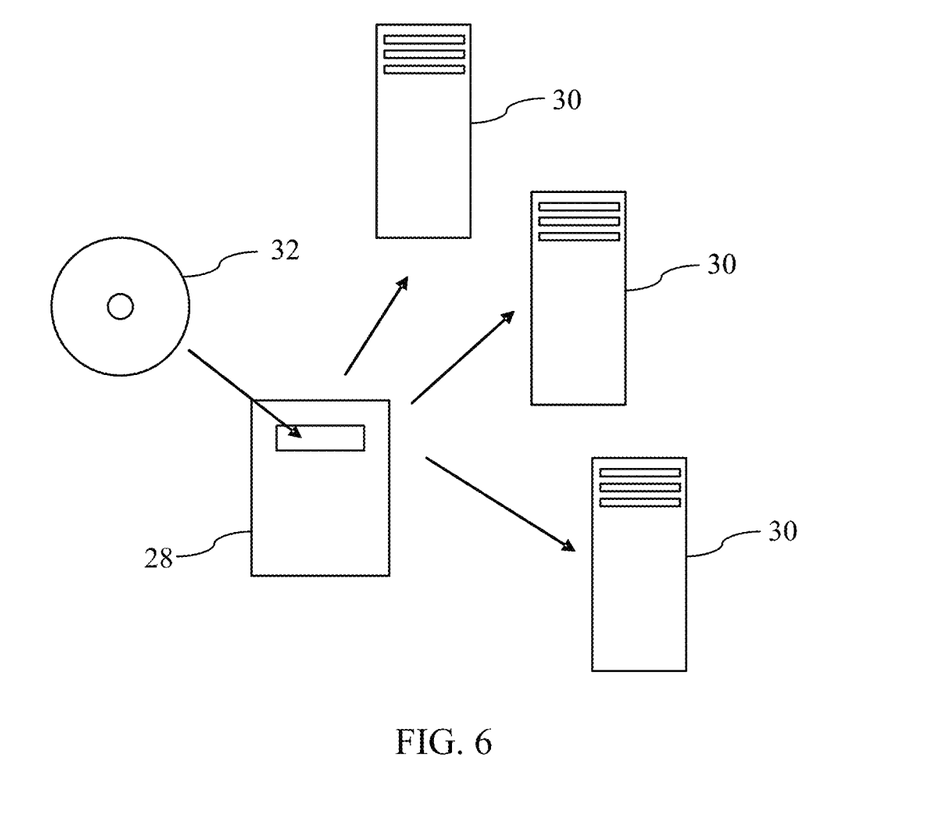
FIG. 6 is a block diagram of a system for measuring delay.

FIG. 6 illustrates requests arriving at a processor 28 that allocates the requests to resources 30. Although the resources 30 are shown as hardware components, they could equally be software components or memory locations, for example. The processor 28 is controlled using a computer program product stored on a computer readable medium 32, which here is a CD-ROM. The program includes instructions that are used to control the processor 28. As requests are received, any delay in their allocation (implying that the required resource 30 is not available) is monitored by the processor 28 as described above. The average delay of the request allocation can be calculated accurately, without the requirement for a large memory overhead to store the necessary data.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, implemented on at least one processor circuit, of measuring a delay in an allocation of resources of a computer system, for a set of sequential requests for the resources, the method comprising:
    recording a start time for a receipt of a first request of the set of sequential requests;
    incrementing a request start time counter, for each subsequently received request, with a current time minus a recorded start time;
    incrementing a total time counter, for each request allocation, with the current time minus the recorded start time;
    incrementing a request counter for each request allocation, and
    determining an approximation of an average delay time that comprises a square of a number of allocated requests divided by the number of received requests, wherein the number of allocated requests and the number of received requests are each counted beginning at a second request.

2. The method of claim 1, the method further comprising determining that all received requests have been allocated, decrementing the total time counter by the request start time counter and determining an average delay time from the total time counter divided by the request counter.

3. The method of claim 1, the method further comprising determining an approximation of an average delay time from the total time counter divided by the request counter minus the total time counter.

4. A system, implemented on at least one processor circuit, for measuring a delay in an allocation of resources of a computer system, for a set of sequential requests for the resources, the system comprising at least one processor arranged to:
    record a start time for a receipt of a first request of the set of sequential requests;
    increment a request start time counter, for each subsequently received request, with a current time minus a recorded start time;
    increment a total time counter, for each request allocation, with the current time minus the recorded start time;
    increment a request counter, for each request allocation, and
    determine an approximation of an average delay time that comprises a square of a number of allocated requests divided by the number of received requests, wherein the number of allocated requests and the number of received requests are each counted beginning at a second request.

5. The system of claim 4, wherein the at least one processor is further arranged to determine that all received requests have been allocated, decrement the total time counter by the request start time counter and determine an average delay time from the total time counter divided by the request counter.

6. The system of claim 4, wherein the at least one processor is further arranged to determine an approximation of an average delay time from the total time counter divided by the request counter minus the total time counter, with an adjustment factor applied to the total time counter.

7. A computer program product contained on a non-transitory computer readable data storage medium, the computer program product for measuring the delay in the allocation of resources of a computer system, for a set of sequential requests for the resources, the product comprising instructions for:
    recording a start time for a receipt of a first request of the set of sequential requests;
    incrementing a request start time counter, for each subsequently received request, with a current time minus the recorded start time;
    incrementing a total time counter, for each request allocation, with the current time minus the recorded start time;
    incrementing a request counter for each request allocation, and determining an approximation of an average delay time that comprises a square of a number of allocated requests divided by the number of received requests, wherein the number of allocated requests and the number of received requests are each counted beginning at a second request.

8. The computer program product of claim 7, the computer program product further comprising instructions for determining that all received requests have been allocated, decrementing the total time counter by the request start time counter and determining an average delay time from the total time counter divided by the request counter.

9. The computer program product of claim 7, the computer program product further comprising instructions for determining an approximation of an average delay time from the total time counter divided by the request counter minus the total time counter, with an adjustment factor applied to the total time counter.

\* \* \* \* \*